Figure 1:
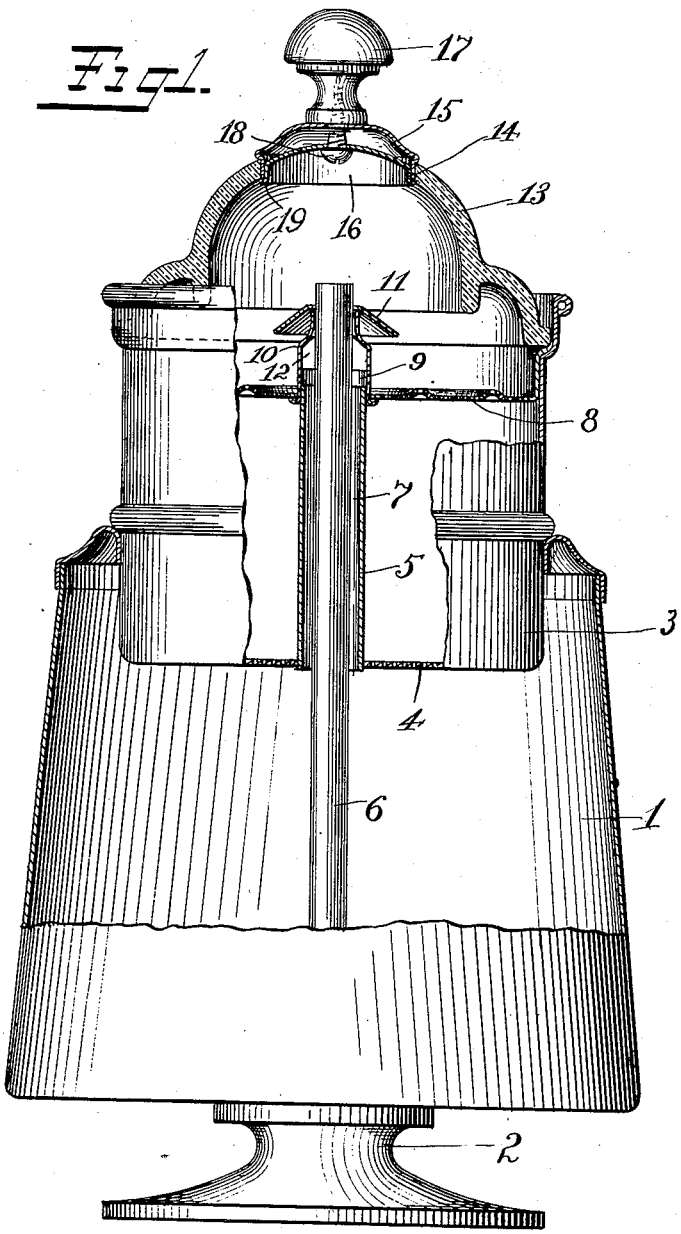

G. E. SAVAGE.
PERCOLATOR POT.
APPLICATION FILED DEC. 17, 1909.

992,262.

Patented May 16, 1911.

2 SHEETS—SHEET 1.

Witnesses:
Fred M. Dannenfelser
Chas. W. Peard

Inventor
GEORGE E. SAVAGE.
By his Attorneys

G. E. SAVAGE.
PERCOLATOR POT.
APPLICATION FILED DEC. 17, 1909.
992,262.
Patented May 16, 1911.
2 SHEETS—SHEET 2.
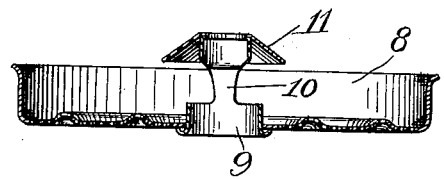
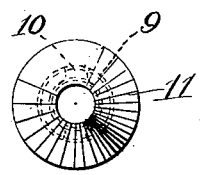
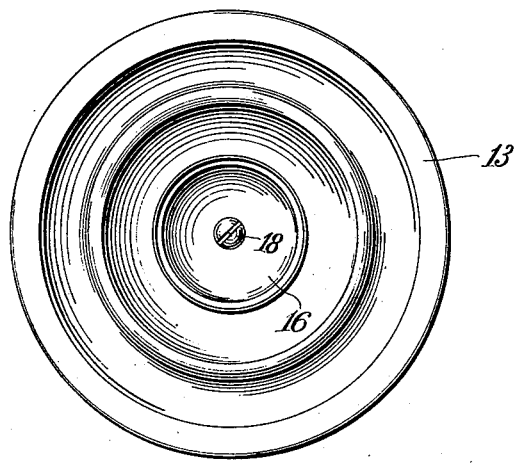
Witnesses:
Inventor
GEORGE E. SAVAGE.
By his Attorneys

UNITED STATES PATENT OFFICE.

GEORGE E. SAVAGE, OF MERIDEN, CONNECTICUT, ASSIGNOR TO MANNING, BOWMAN & COMPANY, OF MERIDEN, CONNECTICUT, A CORPORATION OF CONNECTICUT.

PERCOLATOR-POT.

992,262.

Specification of Letters Patent.

Patented May 16, 1911.

Application filed December 17, 1909. Serial No. 533,537.

*To all whom it may concern:*

Be it known that I, GEORGE E. SAVAGE, a citizen of the United States, residing at Meriden, county of New Haven, State of Connecticut, have invented certain new and useful Improvements in Percolator-Pots, of which the following is a full, clear, and exact description.

My invention relates to improvements in percolator pots, and is particularly concerned with means for preventing the hot liquid which flows from the percolating tube and impinges against the glass top or cover usually employed in devices of this kind from cracking said cover.

The invention also contemplates means for preventing the accumulation of surplus liquid in the retainer which usually overlies the coffee in the container; and a further object of the invention is to more effectually distribute the percolated liquid over the contents of the container.

With these objects in view, the invention consists in the construction and arrangement of parts, a preferred embodiment of which is illustrated in the accompanying drawings, in which—

Figure 1 is a vertical sectional view of a percolating pot and container, the latter being broken away for clear illustration of the interior. Fig. 2 is a sectional view of the retainer, showing the overflow and distributer. Fig. 3 is a plan view of the distributer, detached. Fig. 4 is an under side view of the glass top or cover of the container.

The embodiment of the invention herein selected for illustration comprises the main pot 1, having a heating chamber 2 communicating therewith. Within the mouth of the pot is seated a container 3, having the usual perforated bottom 4 and having fixed to the bottom a sleeve 5 through which the percolating tube 6 extends when the parts are assembled. The sleeve 5 as shown is of larger diameter than the tube to provide an overflow passage 7 between these parts. Within the container is seated a retainer 8, having a perforated bottom, as shown, at the center of which is secured a tubular overflow member 9 of a diameter to fit snugly over the sleeve 5 of the container. Projecting upwardly from the tubular member 9 are standards 10 upon the upper ends of which is supported a distributer 11, which preferably takes the form of a cone-shaped ring, fitting closely about the upper end of the percolating tube. The spaces 12 between the standards 10 afford communication between the retainer and the passage 7 to return surplus liquid in the former to the pot 1.

The container 3 is provided with the usual glass cover or top 13, which, however, in the form here shown is provided with a comparatively large opening 14 at the top, within which is fitted a metal cap 15 and within this cap is secured a protecting and distributing plate 16, the cap and protecting plate, together with the knob or handle 17 of the cover, being secured together preferably by a screw 18. The rims of the cap 15 and the protecting plate 16 are turned slightly outward, as at 19, so that when the screw 18 is turned up in fastening the parts together, the rim of the protecting plate will wedge that of the cap against the walls of the opening 14, thus holding the parts securely assembled. As the percolated liquid is forcibly ejected from the percolating tube, it will impinge against the protecting plate 16 and be thrown back upon the distributer 11 and into the retainer 8. The interposition of the protecting plate 16 in the glass cover 13 effectually protects the latter from being cracked by the heated liquid. Furthermore, the protecting plate acts as an auxiliary distributer, which, in conjunction with the distributer 11, spreads the percolated liquid well over the surface of the container.

While I have herein shown a particular embodiment of my invention, the same may be altered in details and relative arrangement of parts within the scope of the appended claims.

What I claim is:

1. In a percolator pot having a percolator tube, the combination with a container, of a cover of frangible material therefor, a protecting plate mounted at the center of said cover and extending over the percolator tube to serve as a liquid distributer, a second plate overlying said first mentioned plate leaving an air space between the two, a handle for said cover, and means for securing said plates and handle together and to said cover.

2. In a percolator pot having a percolator tube, the combination with a container of a retainer mounted therein, a distributer carried by said retainer and surrounding the upper end of the percolator tube, a cover for said container having a protecting plate extending over the upper end of said tube and serving at the same time as an auxiliary distributer.

3. In a percolator pot having a percolator tube, the combination with a container having an overflow passage formed therein, of a retainer mounted therein and having an opening communicating with said passage, a distributing plate carried by said retainer and surrounding the upper end of the percolator tube, and a cover for said container having a protecting member extending over the upper end of the percolating tube, said member serving also as an auxiliary distributer.

4. In a percolator pot, the combination with a container, a percolator tube extending through said container to a point adjacent said cover, a portion of said cover over said tube being removed, and a protecting and distributing plate of non-frangible material arranged to replace said removed portion to distribute the liquid ejected from said tube, and to protect the frangible portion of said cover.

5. In a percolator pot, the combination with a container of a percolator tube extending therethrough, a glass cover for said container having a portion thereof extending over said tube removed, a plate of non-frangible material arranged to replace said removed portion, a handle secured to said plate, and means for securing said plate and handle to said cover.

6. In a percolator pot, the combination with a container of a retainer mounted therein, a percolator tube, a cover of frangible material for said container having a portion extending over said tube removed, an inner plate of non-frangible material arranged to replace said removed portion, an outer plate of non-frangible material overlying said inner plate, a handle for said cover, and a single means for securing said plates and handle together to said cover.

GEORGE E. SAVAGE.

Witnesses:
CHAS. A. PEARD,
IDA M. HUNZIKER.